US008952286B2

(12) United States Patent
Han et al.

(10) Patent No.: US 8,952,286 B2

(45) Date of Patent: Feb. 10, 2015

(54) RESISTANCE WELDING HIGH FREQUENCY TRANSFORMER AND SPOT WELDING MACHINE

(75) Inventors: Yuqi Han, Shenzhen (CN); Zhiwei Chen, Shenzhen (CN); Yangchun Zhou, Shenzhen (CN); Zaixiang Ren, Shenzhen (CN); Baijun Li, Shenzhen (CN); Kongchen Zhu, Shenzhen (CN)

(73) Assignee: Shenzhen Hongbai Technology Industrial Co., Ltd., Shenzhen (CN)

( * ) Notice: Subject to any disclaimer, the term of this patent is extended or adjusted under 35 U.S.C. 154(b) by 42 days.

(21) Appl. No.: 13/636,336

(22) PCT Filed: May 19, 2010

(86) PCT No.: PCT/CN2010/072916

§ 371 (c)(1), (2), (4) Date: Sep. 20, 2012

(87) PCT Pub. No.: WO2011/116544

PCT Pub. Date: Sep. 29, 2011

(65) Prior Publication Data

US 2013/0008877 A1 Jan. 10, 2013

(30) Foreign Application Priority Data

Mar. 23, 2010 (CN) .......................... 2010 1 0130466

(51) Int. Cl.

| | |
|---|---|
| ***B23K 9/10*** | (2006.01) |
| ***H01F 27/28*** | (2006.01) |
| *H01F 38/08* | (2006.01) |
| *H01F 27/40* | (2006.01) |

(52) U.S. Cl.

CPC .......... *H01F 27/2876* (2013.01); *H01F 38/085* (2013.01); *H01F 2027/408* (2013.01)

USPC .......................................... 219/116; 209/78.01

(58) Field of Classification Search

USPC ............................................... 219/116, 78.01

See application file for complete search history.

(56) References Cited

U.S. PATENT DOCUMENTS 4,507,533 A * 3/1985 Inoue ......................... 219/69.18

5,160,820 A * 11/1992 Tsujii et al. .................. 219/116

(Continued)

*Primary Examiner* — Henry Yuen

*Assistant Examiner* — Ayub Maye

(74) *Attorney, Agent, or Firm* — Anova Law Group, PLLC

(57) ABSTRACT

A resistance welding high frequency transformer and a high frequency resistance welding machine using the same are disclosed. The transformer comprises a magnetic core (6), primary coils (1, 2, 3) and secondary coils (4, 5). The primary coils and the secondary coils are alternatively positioned layer by layer. Each secondary coil is arranged between two primary coils. The primary coils are provided at the internal side and the external side of the secondary coil. The secondary coil is composed of red copper pipes through which water flows. Each secondary coil is wound with one to two turns. The red copper pipes of the secondary coils and rectifier diodes constitute a full-wave rectifier circuit. The resistance welding high frequency transformer can be wound conveniently. Its structure can reduce size, weight, leakage inductance and copper circuit loss, and the heat from the primary coils and secondary coils is dissipated conveniently, thus enabling the high-frequency transformer to output high current and high power with a high duty cycle. The resistance welding machine using the transformer has high power factor, high output power, small volume, light weight, and saves energy and material, which is especially suitable to produce a suspension spot welding machine with the integration of the transformer and welding tongs.

19 Claims, 3 Drawing Sheets

(56) References Cited

U.S. PATENT DOCUMENTS 5,668,421 A * 9/1997 Gladish ...................... 310/12.11
5,770,909 A * 6/1998 Rosen et al. .................. 310/113
5,954,985 A * 9/1999 Scott et al. .................... 219/666

* cited by examiner

RESISTANCE WELDING HIGH FREQUENCY TRANSFORMER AND SPOT WELDING MACHINE

TECHNICAL FIELD

The present invention relates to a high frequency resistance welding transformer and a spot welding machine using the said transformer. The present invention is suitable for the high frequency inverter switch power supply and resistance welding power supply.

BACKGROUND

High frequency switch power supply technology is widely used in industry, agriculture and national defense currently, especially resistance welding, to reduce the volume of resistance welding machine and save an amount of copper. However, due to electronic devices, materials of high frequency transformer and the limitations of production process, distribution parameters (capacitance, inductance, leakage inductance and loss) of high frequency transformer are increased and high frequency transformer is difficult to output a large current at low voltage, particularly, the duty rate is lower and can not meet the needs of production. The disadvantages said above are mainly reflected in the following four aspects:

First, because the capacitance and inductance are too large and magnetic circuit is too long and the leakage inductance is intense, the expect stress of IGBT is too high.

Second, because the parameters of single transformer and the discreteness of performance, the prior art is difficult to use multiple transformers in parallel.

Third, because multiple power supplies are connected in parallel, taking sharing current technology, responding slowly, high cost, complex circuit, the prior art is difficult to meet the requirements of spot welding machine and the volume is too large.

Fourth, the loss of transformer is too large. The cooling of high frequency transformer is difficult. The duty rate is low.

SUMMARY OF THE INVENTION

The object of the present invention is increasing the power of single transformer, reducing the number of transformers connected in parallel and reducing the volume of the transformer to reduce the leakage inductance of transformer and the discreteness of parameters. In addition, the present invention improves the duty rate of transformer by reducing transformer losses. In order to achieve the above purposes, a power high frequency transformer is divided into multiple sub-transformers and transformer units by breaking up the whole into parts so as to increase the duty rate and reduce the volume of the transformer.

The present invention provides a technical solution as described below. A resistance welding high frequency transformer includes primary coils, secondary coils, magnetic cores, transformer shell, rectifiers, positive (negative) output terminals of transformer, cooling pipes, rectifier diode and radiator for fixing the rectifier diode, wherein the negative (positive) output terminals are center tap of the transformer. The said high frequency transformer includes one to ten sub-transformers which are provided with a magnetic core (magnetic circuit) and are relatively independent. The sub-transformer includes at least one transformer unit, and the said transformer unit includes at least one group of primary and secondary coil units.

The primary coil unit of the said group of primary and secondary coil units includes at least two B coils and one A coil, wherein the two B coils are in parallel connection (connected with the homonymous terminal) and then in series connection with one A coil (connected with the synonymous terminal).

The secondary coil unit of the said group of primary and secondary coil units is composed of two secondary coils connected end to end. The said two secondary coils are connected with each other at the synonymous terminal. The center tap is the negative output terminal of the rectifier. The other two lead terminals of the said two secondary coils are respectively connected with anode (cathode) of the corresponding rectifier diodes.

Three coils of the said primary coil and two secondary coils of the secondary coil unit are alternately placed, wherein the position of the five coils is that the primary B coil is located at outside of the two secondary coils and the primary A coil is located between the two secondary coils and the said group of primary and secondary coil units are uniformly placed on a circular cylinder of the same core according to the above order.

The rectifier of the said transformer includes two sets of diodes, wherein at least two diodes of the two sets of diodes and the two secondary coils of one group of primary and secondary coils which are connected end to end composed full wave rectifier circuit. The center terminal of the said secondary coils is connected to negative (positive) output terminals of the transformer by multiple magnetic wires; the other two terminals are respectively connected to anode (cathode) of the two rectifier diodes. The cathode (anode) of the said rectifier diodes is connected to the heat sink with water, and the said rectifier diodes are fixed on the heat sink as positive (negative) output terminals of the transformer. The said secondary coil is formed by wrapping one to four layers copper tubes to 1-2 turns and connected with corresponding rectifier diodes through copper tube, wherein the copper tube is with a diameter of 3-10 mm. Thus solve the problem of electric and water.

The said copper tube connecting the secondary coil and rectifier diodes is provided with circulating water for cooling. The said radiator of diodes is also provided with circulating water for cooling. Because the primary coil is adjacent to the secondary coil, the copper tube of secondary coil can take away the heat of the primary coil.

The said B coil of the primary is formed by wrapping N (N≥1, 50>n>10 natural number) magnetic wires (or flat magnetic wires which has an area similar to the circular magnetic wires) with a diameter of 0.3 to 1.0 mm to n turns, and the A coil is formed by wrapping 2N (N≥1, 50>n>10 natural number) magnetic wires (or flat magnetic wires which has an area similar to the circular magnetic wires) with a diameter of 0.3 to 1.0 mm to n turns. The two B coils are in parallel connection (connected with the homonymous terminal) and then in series connection with one A coil (connected with the synonymous terminal) to form a primary coil unit.

The said secondary coil is formed by wrapping copper tube which 3-10 mm in diameter and 0.5-2 mm in wall thickness to facilitate the wrapping, reduce the volume, reduce the leakage inductance and improve the duty rate.

The circulating water pipe of copper tube for cooling the said secondary coils is communicated with the circulating water pipe of the rectifier diode heat sink to facilitate cooling and improve the duty rate.

The magnetic core is selected PM or UYF type to increase the window area of transformer easily. The transformer design parameter i.e. the ratio of primary and secondary is (30-80):1. The insulating material is polyethylene film with thickness of 0.05-0.1 mm. The output current is 3000-20000 A; the output power is 10-200 KW. The duty rate is 10-50%.

A high frequency spot welding machine uses anyone of the said above resistance welding high frequency transformer.

The beneficial effect of the invention is described below.

First, because the secondary coil is formed by wrapping copper tube which 3-10 mm in diameter and 0.5-2 mm in wall thickness, the present invention reduces the leakage inductance and the IGBT stress requirements.

Second, the present invention uses copper tube to cooling by water so as to reduce the volume of transformer and improve the power and duty rate of the transformer.

Third, different from the common high frequency power transformer, the transformer of present invention has advantages of small, light and high power factor so as to more suitable for the producing of high power suspension spot welding machine, wherein the transformer and welding clamp are integrated, and reduces the power consumption of high power suspension spot welding machine.

Fourth, the same transformer is provided with multiple sub-transformers. Each sub-transformer is provided with multiple transformer units. Each transformer unit is provided with multiple primary and secondary coils arranged at the same magnetic core. All transformer units can output respectively and compose a complete transformer.

Fifth, the lead coils of the secondary coil and the rectifier diodes are connected directly by copper tube so as to solve the problem of electric and cooling by water. The rectifier diodes are evenly distributed to each coil of the secondary, thereby the rectifier diodes current sharing.

Sixth, the heat dispersion and consume reduction of the primary are different from the secondary. The primary coil is adjacent to the secondary coil which is provided with water pipe; thereby the water pipe takes away the heat from the primary coil.

DETAILED DESCRIPTION OF THE INVENTION

The present invention will be described in detail with reference to the figures and embodiments.

Figure 5:
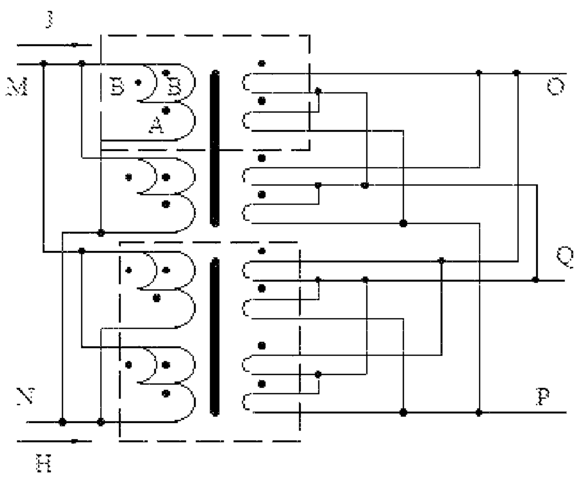
FIG. 5 is a schematic diagram of a transformer according to the present invention.

The working principle of the present invention is shown in FIG. 5. The said high frequency resistance welding transformer is composed of two sub-transformers. As shown in H unit, each sub-transformer is composed of two transformer units. As shown in J unit, each transformer unit is composed of three primary coils (as 2, 3 in FIG. 2) and two secondary coils (as 4, 5 in FIG. 2).

Figure 1:
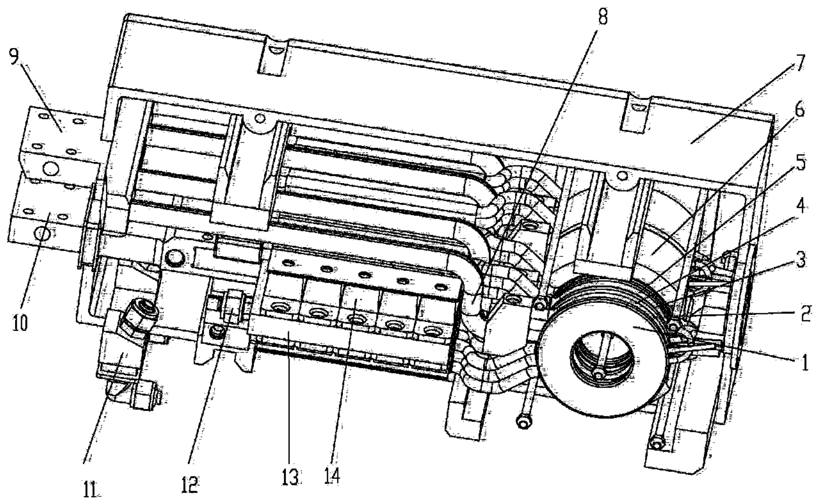
FIG. 1 is a schematic drawing of the unitary transformer structure according to the present invention.
Figure 2:
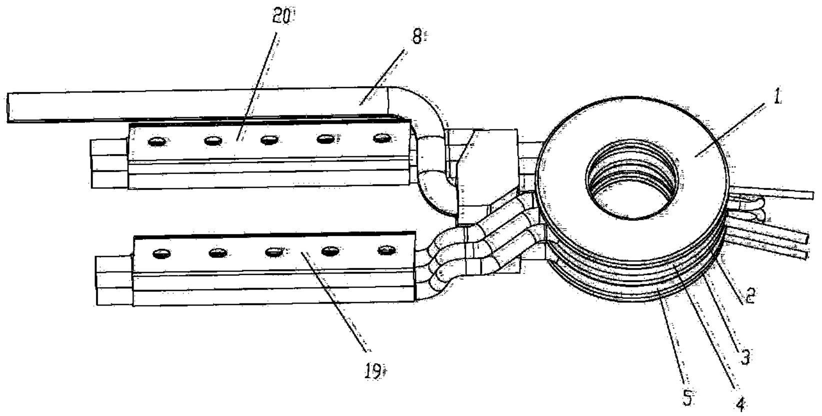
FIG. 2 is a schematic drawing of one group of primary and secondary coil units of a sub-transformer unit according to the present invention.
Figure 4:
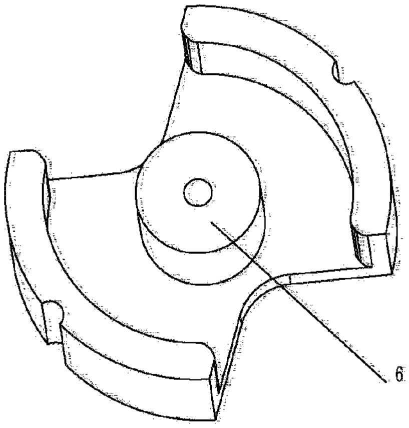
FIG. 4 is a schematic drawing of a magnetic core according to the present invention.

As shown in FIGS. 1, 2 and 4, wherein, 1 indicates B coil of the primary coil unit of the transformer. 2 indicate a coil of the primary coil unit of the transformer. 3 indicates B coil of the primary coil unit of the transformer. 4 indicate secondary coil. 5 indicate the secondary coil. 6 indicate the magnetic core. 7 indicate the former shell. 8 indicate the center tap of the sub-transformer. 9 indicates negative output terminal (i.e. the center tap of the transformer) of the transformer and rectifier. 10 indicate the positive output terminal of the transformer and rectifier. 11 indicate cooling water connector. 12 indicate cooling water connector. 13 indicate rectifier diode heat sink. 14 indicate rectifier diode.

Figure 3:
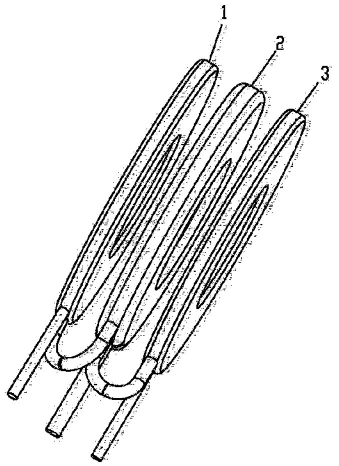
FIG. 3 is a schematic drawing of one group of primary coil units according to the present invention.

FIG. 3 shows an embodiment of transformer unit. A group of primary coils i.e. one B coil unit and one A coil unit and one B coil unit (1 indicates B coil of the primary coil unit of the transformer. 2 indicates A coil of the primary coil unit of the transformer. 3 indicates B coil of the primary coil unit of the transformer) and two secondary coil units connected end to end are alternately placed, as shown in FIG. 2, wherein the order is that 1 indicating primary B coil, 4 indicating the secondary coil, 2 indicating primary A coil, 5 indicating the secondary coil, 3 indicating primary B coil, 8 indicating the center tap of two secondary coils connected end to end, 19 and 20 indicating the connecting terminal of the secondary which leads to the rectifier diode and has feature of electric and water.

The primary coils of two transformer units said above are connected with the homonymous terminal. The center taps of the secondary coil are connected with each other. The other two terminals of the secondary coils are connected to corresponding rectifier diodes respectively, and fix the rectifier diodes on the radiator. Then two transformer units are arranged on the same magnetic core to compose a sub-transformer.

The primary coils of two sub-transformers said above are connected in parallel i.e. connected with the homonymous terminals. The center taps of the said secondary coils are connected to negative output terminals of the transformer by multiple magnetic wires. The lead coil terminal of two groups of rectifier diodes of the secondary are connected to the anode of corresponding rectifier diodes, and then connected to the positive output terminal of the transformer by cathode i.e. heat sink of the rectifier diode.

The said primary B coil of the transformer unit is formed by wrapping N ($N \geq 1$, $50 > n > 10$ natural number) magnetic wires to n turns. The A coil is formed by wrapping 2N magnetic wires to n turns. The two B coils is connected with the A coil end to end so as to form a primary coil unit.

The said copper tube connecting the secondary coil and rectifier diodes is provided with circulating water for cooling. The said radiator of diodes is also provided with circulating water for cooling. Because the primary coil is adjacent to the secondary coil, the copper tube of secondary coil can take away the heat of the primary coil so as to achieve the object of cooling the primary coil.

The circulating water pipe of copper tube for cooling the said secondary coils is communicated with the circulating water pipe of the rectifier diode heat sink to facilitate cooling and improve the duty rate of the transformer.

The said magnetic core is selected PM or UYF type to increase the window area of transformer coil easily.

The transformer design parameter i.e. the ratio of primary and secondary is (30-80):1. The said primary coil is formed by the braiding of multiple magnetic wires or flat magnetic wires with corresponding area. The said secondary coil is formed by wrapping one to four layers copper tubes one to two turns, wherein the copper tube is with a diameter of 3 to 10 mm, wall thickness of 0.5 to 2 mm. The insulating material is polyethylene film with thickness of 0.05-0.1 mm. The output current is 3000-20000 A. The output power is 10-200 KW. The duty rate is 10-50%.

Although preferred embodiments of the present invention are disclosed for purpose of illustration, various modifications, add and substitutions will be apparent to those skilled in the art without departing form the spirit and scope of the present invention as outlined in the claims appended hereto.

The invention claimed is:

1. A resistance welding high frequency transformer, including:
- primary coils,
- secondary coils,
- a transformer shell,
- rectifiers,
- positive and negative output terminals of the residence welding high frequency transformer,
- cooling pipes,
- rectifier diode coupled to the cooling pipes and
- radiator for fixing the rectifier diode,
- wherein the negative output terminal or the positive output terminal are center tap of the transformer,
- the high frequency transformer includes one to ten sub-transformers which are provided with a magnetic core and are relative independent,
- the one to ten sub-transformers including at least one transformer unit, and
- the transformer unit includes at least one group of primary and secondary coil units, wherein the primary coils in the coil units are formed by wires and the secondary coils in the coil units are formed by multiple turns of copper tubes respectively connected with the cooling pipes coupled to the rectifiers such that both the at least one transformer unit and the rectifier are cooled by coolant running through the copper tubes and the cooling pipes,
- wherein the magnetic core is a cylindrical shape disposed on a circular-shaped disc base, all the at least one group of primary and secondary coil units use same cylindrical magnetic core, and the circular-shaped disc base houses the at least one group of primary and secondary coil units.

2. A high frequency resistance welding transformer according to claim 1,
- wherein the primary coil unit of the at least one group of primary and secondary coil units includes at least two B coils and one A coil, and
- wherein the at least two B coils are in parallel connection connected with a homonymous terminal and then the two B coils are in series connection with the one A coil connected with a synonymous terminal.

3. A high frequency resistance welding transformer according to claim 1, wherein
- the secondary coil unit of the at least one group of primary and secondary coil units is composed of two secondary coils connected end to end, and
- the two secondary coils are connected with each other at the synonymous terminal, and
- the center tap is the negative output terminal of the rectifiers and
- the other two lead terminals of the two secondary coils are respectively connected with anode or cathode of corresponding rectifier diodes.

4. A high frequency resistance welding transformer according to claim 1, wherein the copper tubes connected with the rectifier diodes are provided with circulating water for cooling and the radiator of the rectifier diode is also provided with circulating water.

5. A high frequency resistance welding transformer according to claim 1, wherein the magnetic core is of a PM type or a UYF type.

6. A high frequency resistance welding transformer according to claim 1, wherein
- a ratio of primary and secondary is (30-80):1, and
- the insulating material is polyethylene film with a thickness of 0.05-0.1 mm, and
- output current is 3000-20000 A, and output power is 10-200 KW, and duty rate is 10-50%.

7. A secondary high frequency spot welding machine, wherein the transformer of the high frequency spot welding machine is a high frequency resistance welding transformer according to claim 1.

8. A secondary high frequency spot welding machine, wherein the transformer of the high frequency spot welding machine is a high frequency resistance welding transformer according to claim 1.

9. A high frequency resistance welding transformer according to claim 2,
- wherein three coils of the primary coil unit and two secondary coils of the secondary coil unit are disc-shaped and alternately placed on a cylindrical former shell, and
- wherein position of the five coils is arranged such that the at least two B coils of the primary coil unit are located at outside of the two secondary coils and the at least one A coil of the primary coil unit is located between the two secondary coils and the group of primary and secondary coil units are uniformly placed on same cylindrical magnetic core according to the above order.

10. A high frequency resistance welding transformer according to claim 2, wherein
- the B coil of the primary coils is formed by wrapping N, where N≥1, 50>n>10, and n is a natural number, magnetic wires with a diameter of 0.3 to 1.0 mm to n turns, and
- the A coil of the primary coils is formed by wrapping 2N, where N≥1, 50>n>10, and n is a natural number, magnetic wires with a diameter of 0.3 to 1.0 mm to n turns, and
- the two B coils are in parallel connection connected with the homonymous end and then in series connection with the A coil connected with the synonymous end to form a primary coil unit.

11. A secondary high frequency spot welding machine, wherein the transformer of the high frequency spot welding machine is a high frequency resistance welding transformer according to claim 2.

12. A secondary high frequency spot welding machine, wherein the transformer of the high frequency spot welding machine is a high frequency resistance welding transformer according to claim 3.

13. A high frequency resistance welding transformer according to claim 3,
- wherein three coils of the primary coil unit and two secondary coils of the secondary coil unit are alternately placed,
- wherein the position of the five coils is arranged such that the at least two B coils of the primary coil unit are located at outside of the two secondary coils and the at least one A coil of the primary coil unit is located between the two secondary coils and the group of primary and secondary coil units are uniformly placed on same cylindrical magnetic core according to the above order.

14. A high frequency resistance welding transformer of claim 9, wherein the rectifiers of the said transformer includes two sets of diodes, and wherein at least two diodes of the two sets of diodes and the two secondary coils of at least one group of primary and secondary coils which are connected end to end composed full wave rectifier circuit, and the center terminal of the secondary coils is connected to negative or positive output terminals of the transformer by multiple magnetic wires, and the other two terminals are respectively connected to anode or cathode of the two rectifier diodes, the cathode or anode of the rectifier diodes are connected to the heat sink with water, and the rectifier diodes are fixed on the heat sink as positive or negative output terminals of the transformer.

15. A secondary high frequency spot welding machine, wherein the transformer of the high frequency spot welding machine is a high frequency resistance welding transformer according to claim 9.

16. A high frequency resistance welding transformer according to claim 4, wherein the circulating water pipe of copper tube for cooling the secondary coils is communicated with the circulating water pipe of the rectifier diode heat sink.

17. A high frequency resistance welding transformer according to claim 10, wherein the primary coil is formed by the braiding of multiple magnetic wires or wrapping of flat copper magnetic wires.

18. A high frequency resistance welding transformer according to claim 10, wherein the said secondary coil is formed by wrapping one to four layers of copper tube with two or more turns, wherein the copper tube is with a diameter of 3 to 10 mm, and a wall thickness of 0.5 to 2 mm.

19. A secondary high frequency spot welding machine, wherein the transformer of the high frequency spot welding machine is a high frequency resistance welding transformer according to claim 14.

* * * * *